United States Patent [19]
Megna

[11] 4,238,574
[45] Dec. 9, 1980

[54] BLENDS OF THERMOPLASTIC POLYURETHANE ELASTOMERS AND ETHYLENE/CARBOXYLIC ACID COPOLYMERS FOR BLOW MOLDING

[75] Inventor: Ignazio S. Megna, Lebanon, N.J.
[73] Assignee: American Cyanamid Company, Stamford, Conn.
[21] Appl. No.: 23,913
[22] Filed: Mar. 26, 1979
[51] Int. Cl.$^3$ .............................................. C08L 75/00
[52] U.S. Cl. .............................. 525/130; 260/28 SA; 525/127
[58] Field of Search ................... 260/859 R; 525/130, 525/127

[56] References Cited
U.S. PATENT DOCUMENTS

| | | | |
|---|---|---|---|
| 3,658,635 | 4/1972 | Eustice | 260/859 R |
| 3,833,708 | 9/1974 | Miller | 260/859 R |

*Primary Examiner*—Paul Lieberman
*Attorney, Agent, or Firm*—Frank M. Van Riet

[57] ABSTRACT

Blends of thermoplastic polyurethane elastomers and neutralized ethylene/carboxylic acid copolymers which are useful for blow-molding applications, are disclosed.

9 Claims, No Drawings

BLENDS OF THERMOPLASTIC POLYURETHANE ELASTOMERS AND ETHYLENE/CARBOXYLIC ACID COPOLYMERS FOR BLOW MOLDING

BACKGROUND OF THE INVENTION

Thermoplastic polyurethane elastomers are well-known. They are essentially the 1:1 reaction products of polymeric diols, optionally, one or more monomeric diols and aromatic diisocyanates. The polymers generally exhibit outstanding physical properties; however, in blow-molding applications they lack sufficient melt strength at normal blow molding processing temperatures. For instance, when one attempts to process thermoplastic polyurethanes by blow molding, the hollow segment of extrudate which is to be blown (also known as a parison), instead of hanging from the nozzle, often drops off before blowing can be effected. When attempts are made to blow film, the polymer tends to fold back on the surface of the extrusion die.

The properties and, therefore, the utility of physical blends of polymers are strongly dependent on the degree of compatibility of the components. A very small number of amorphous polymer pairs are thermodynamically compatible, i.e., truly soluble in each other. Blends which display an intermediate degree of compatibility, i.e., between incompatible and completely or thermodynamically compatible, also are known to exist. These systems are called "mechanically" compatible or semi-compatible. Examples include a blend of a butadiene-acrylonitrile copolymer and a styrene-acrylonitrile copolymer (known as ABS plastic) and a blend of polystyrene and SBR rubber (known as impact polystyrene.) These blends are essentially identical to the incompatible blends in their thermal behavior, i.e., they display two major glass transition temperatures (Tg). However, their morphology is finer and they are more translucent. They display a higher degree of interphase adhesion, which is reflected in improved mechanical properties, e.g., melt strength, see Noshay and McGrath, Block Copolymers: Overview and Critical Survey, Academic Press, N.Y. 1977, pages 1–10.

SUMMARY OF THE INVENTION

In accordance with the present invention, it has been discovered that blends of from about 85-99%, preferably about 90-97% of a thermoplastic polyurethane elastomer and from about 1 to 15 percent, by weight, preferably about 3 to 10 percent, by weight, of a neutralized ionic polymer of ethylene, more particularly a 10–100% neutralized ethylene/carboxylic acid copolymer, are readily blow molded at conventional blow molding processing temperatures.

DESCRIPTION OF THE INVENTION INCLUDING PREFERRED EMBODIMENTS

The Thermoplastic Polyurethane Elastomers

The thermoplastic polyurethane elastomers which are useful in making the blow-moldable blends of the invention comprise the reaction products of about one molar proportion of a polymeric glycol, having a molecular weight of from about 400 to 3000, optionally from about 1 to 10 molar proportions of one or more low-molecular weight aliphatic diols, preferably saturated, and an aromatic diisocyanate in an amount sufficient to react with essentially all of the hydroxyl groups of the polymeric glycol and the optional aliphatic diols, i.e., the ratio of total isocyanate groups (NCO) to the total hydroxyl groups (OH) ranging from about 0.95 to about 1.1.

The polymeric glycols which are useful in making the thermoplastic polyurethanes include hydroxyl terminated aliphatic polyesters, derived in known manner from the condensation of an aliphatic dicarboxylic acid, e.g., adipic acid, with a stoichiometric excess of one or more saturated aliphatic diols, e.g., ethylene glycol, propylene glycol, 1,4-butanediol, and the like; aliphatic polyethers, such as polytetramethylene ether glycol, polypropylene ether glycol, poly(ethylene-propylene)ether glycol, and the like; and polythioethers, derived by the self-condensation of thiodiethanol or the co-condensation of a major proportion of thiodiethanol with a minor proportion of one or more saturated aliphatic diols under the influence of an acidic catalyst, e.g., phosphorous acid. The term "aliphatic diol," as it is used herein, includes dihydroxyalkylated derivatives of difunctional phenols, such as the bis(hydroxyethyl)ether of hydroquinone.

The aromatic diisocyanates which are useful in preparing the thermoplastic polyurethanes include, but are not limited to, the most commonly used aromatic diisocyanates, viz. 2,4- and 2,6-tolylene diisocyanate and (isomeric mixtures thereof), known as TDI, and methylenebis(4-phenyl isocyanate), known as MDI. The preferred aromatic diisocyanate is methylenebis(4-phenylisocyanate).

The thermoplastic polyurethane elastomers are oftentimes prepared in the presence of a catalyst, e.g., stannous octoate. Other catalysts are known in the art. The polymers are well-known and have been used commercially for some time. They are described, among other places, in Bruins, Polyurethane Technology, Interscience Publishers, pages 198–200, and in Modern Plastics Encyclopedia, Vol. 52, No. 10A, 1975, page 84.

The Ethylene/Carboxylic Acid Copolymers

The ethylene/carboxylic acid copolymers useful in making the blends of the invention are known and are commercially available. They contain about 70 to 98.5 percent by weight, preferably about 85–95%, of ethylene units and about 1.5 to 30 percent, by weight, preferably about 5–15%, of carboxylic acid containing units. These polymers are described in U.S. Pat. Nos. 2,599,123 and 3,264,272, hereby incorporated herein by reference. Particularly useful ethylene/carboxylic acid copolymers are those containing acrylic acid, methacrylic acid, maleic acid, fumaric acid, ethyl hydrogen maleate or methyl hydrogen maleate as the carboxylic acid containing comonomer. The preferred comonomers are acrylic or methacrylic acid which are preferably incorporated in amounts of from about 5.0 to about 15 percent by weight.

The carboxylic acid groups in the copolymers are partially or totally neutralized i.e. 10–100%, preferably 50–100% with metal ions, preferably alkali metal ions, alkaline earth metal ions, or zinc ions, as described in U.S. Pat. No. 3,264,272 above. Preferred metal ions include sodium and zinc. Such neutralized polymers are sometimes called ionomers.

Preparation of the Blends

The thermoplastic polyurethane elastomer and the ethylene/carboxylic acid copolymer, optionally along with other conventional additives, such as stabilizers, carbon black and other fillers, and the like, may be mixed in conventional manner using conventional mixing and blending equipment, such as:
1. A single screw extruder with a mixing die or mixing torpedo at 380° to 420° F. for 1 to 3 minutes.
2. A twin screw continuous mixer-extruder at 350° to 420° F. for 1 to 2 minutes in the mixer before extrusion.
3. A standard injection molding machine at 390° to 430° F. for 1 to 3 minutes.

The mixed blends are then granulated or pelletized and dried in any convenient manner e.g. at 100° to 200° for 2 to 3 hours or to a moisture content of less than about 0.06%.

Blow Molding of the Blends

The blow molding art is well-known; see for example Modern Plastics Encyclopedia, Vol. 52, No. 10A, October, 1975, pages 246-255, inclusive. Typically, dried pellets or granules of the resin are fed into an extruder, in which they are melted by application of heat and shear, and the melt is forced through a suitable cored die to form a hollow tube of nearly molten resin, known as a parison. In so-called extrusion blow molding, this parison is then grasped by a mold which closes over it, and a gas, usually compressed air, is injected into the cavity of the parison, causing the latter to expand against the walls of the mold. The hollow article thus made is then allowed to cool sufficiently so that it can be ejected from the mold without thereby being irreversibly deformed. In injection blow molding, the parison is injected into a closed mold, which is normally transferred to another station where the parison is blown against the walls of the mold to produce the finished shape of the resinous (plastic or elastomeric) article. In the examples described below, the machine used was of the extrusion blow-molding type. The results obtainable with injection blow molding are comparable.

The following examples are set forth for purposes of illustration only and are not to be construed as limitations on the present invention except as set forth in the appended claims. All parts and percentages are by weight unless otherwise specified.

EXAMPLES A, B AND C

Preparation of Polythioether-Based Polyurethane Thermoplastic (A) A mixture of 333 parts of a hydroxyl-terminated polythioether, based on thiodiethanol, having a hydroxyl number of about 56 (number average molecular weight about 2000) and 84 parts of 1,4-butanediol is stirred under nitrogen at about 100° C. Then, 3.5 parts of a processing wax, 2.1 parts of an antioxidant and 0.06 part of adipoyl chloride are added. Methylenebis(4-phenylisocyanate), 283 parts, is then added and rapidly stirred into solution. When all of the diisocyanate is dissolved, 0.07 part of stannous octoate catalyst is added and the viscous reaction mixture is rapidly transferred to a stick-resistant glass tray and cured in an oven at 140° C. for about 2 hours. The cured elastomer is granulated and dried.

Polyurethane thermoplastics are similarly prepared using (B) a hydroxyl-terminated polyethylene adipate and (C) a hydroxyl-terminated polytetramethylene ether glycol instead of the polythioether, except that the catalyst is not required for the polyether and adipoyl chloride is omitted in using the polyester.

EXAMPLE 1

A blend was prepared from 90 parts by weight of the dried, granulated polyurethane of Example A and 10 parts by weight of a high molecular weight polymer of 95% ethylene and 5% methacrylic acid, the carboxyl groups of which are 100% neutralized with sodium ions. The blend was made using a twin-screw continuous extruder mixer and was pelletized and dried for 2 hours at 120° C.

The pelletized blend was blown into excellent bottles using an Impco A13S blow-molding machine on the following extruder barrel temperature range:

| Rear | 340-370° F. |
|---|---|
| Front | 350-380° F. |
| Die Head | 350-380° F. |

The blend exhibited excellent melt characteristics and showed virtually no parison sag. Similar results were achieved when the polyurethane of Examples B & C were substituted for that of Example A. By comparison, bottles could not be blown from the polymers of Examples A, B & C because they had very low melt strength.

EXAMPLE 2

Following the procedure of Example 1, a blend was prepared using 95 parts by weight of the polymer of Example A and 5 parts by weight of a high molecular weight copolymer of 95% ethylene and 5% methacrylic acid, the carboxyl groups of which are 100% neutralized with zinc ions. Very good bottles were blown using the following extruder barrel temperature range:

| Rear | 400° F. |
|---|---|
| Front | 430° F. |
| Die Head | 420° F. |

EXAMPLE 3

Following the procedure of Example 1, a blend was prepared using 97.5 parts by weight of the polymer of Example A and 2.5 parts by weight of a high molecular weight copolymer of 95% ethylene and 5% methacrylic acid, the carboxyl groups of which are 100% neutralized with sodium ions. Good bottles were blown within the following temperature range in the extruder barrel:

| Rear | 350° F. |
|---|---|
| Front | 410-420° F. |
| Die Head | 370-390° F. |

EXAMPLE 4

Following the procedure of Example 1, a blend was prepared using 95 parts by weight of the polymer of Example A and 5 parts by weight of a high molecular weight copolymer of 95% ethylene and 5% methacrylic acid, the hydroxyl groups of which are 100% neutralized with sodium ions. Very good bottles were blown within the following temperature range in the extruder barrel:

| | |
|---|---|
| Rear | 350–380° F. |
| Front | 370–410° F. |
| Die Head | 370–400° F. |

EXAMPLE 5

Following the procedure of Example 1, a blend was prepared using 90 parts by weight of a polyurethane, [prepared by reacting one molar proportion of polyethylene adipate (number average molecular weight 2100), 5 molar proportions of 1,4-butanediol and 6.5 molar proportions of methylenebis(4-phenylisocyanate)], and 10 parts by weight of a high-molecular weight copolymer of 95% ethylene and 5% methacrylic acid, the carboxyl groups of which are 100% neutralized with sodium ions. Good bottles were blown using the following extruder barrel temperatures:

| | |
|---|---|
| Rear | 290° F. |
| Front | 320° F. |
| Die Head | 290° F. |

EXAMPLE 6

Following the procedure of Example 1, a blend was prepared from 90 percent by weight of a polyurethane[-prepared by reacting 1 molar proportion of polytetramethylene ether glycol (number average molecular weight 2000), 5 molar proportions of 1,4-butanediol and 6.5 molar proportions of methylenebis (4-phenylisocyanate)], and 10 parts by weight of a high molecular weight copolymer of 95% ethylene and 5% methacrylic acid, the hydroxyl groups of which are 100% neutralized with sodium ions. Very good bottles were blown with the following extruder barrel temperatures:

| | |
|---|---|
| Rear | 300° F. |
| Front | 320° F. |
| Die Head | 300° F. |

EXAMPLE 7

The procedure of Example 1 is again followed except that the methacrylic acid comonomer is replaced by acrylic acid. Similar results are achieved.

EXAMPLE 8

The procedure of Example 7 is again followed except that the ratio of ethylene to acrylic acid is 70:30 and the copolymer is neutralized to 50% with zinc. Again excellent blow-molded bottles are recovered.

EXAMPLE 9

When the ratio of the polyurethane to ethylene copolymer of Example 2 was changed to 85:15, respectively, an excellent blow-moldable blend resulted.

EXAMPLE 10

Neutralization of the ethylene copolymer of Example 5 to 50%, resulted in an excellent blow-moldable blend.

EXAMPLE 11

When the copolymer of Example 8 was neutralized to only 10%, a good blow-moldable composition was recovered.

EXAMPLE 12

When the 1,4-butanediol of Example A was eliminated from the reaction thereof and the resultant polyurethane was blended with 12% of the ethylene copolymer of Example 1, similar results were achieved.

EXAMPLE 13

The procedure of Example 6 was again followed except that the number average molecular weight of the polytetramethylene ether glycol was about 400. Excellent results were achieved when the resultant polyurethane was blended with the ethylene copolymer thereof.

EXAMPLE 14

The procedure of Example 5 was again followed except that the polyethylene adipate had a number average molecular weight of about 3000. When it was blended with the ethylene copolymer of Example 8, an excellent blow-molded bottle was recovered.

EXAMPLE 15

The procedure of Example A was again followed except that the 1,4-butanediol was replaced by the bis(2 hydroxyethyl)ether of hydroquinone. When the resultant polyurethane was blended with the ethylene copolymer of Example 2, good blow-molded bottles were produced.

EXAMPLES 16–17

When the procedure of Example 1 was again followed except that the sodium neutralizing ion was replaced by (15) potassium, (16) calcium and (17) barium, similar results were achieved.

I claim:

1. A polymer blend consisting essentially of (A) about 90–97 percent by weight of a thermoplastic polyurethane elastomer, said elastomer comprising the product of reaction of about one molar proportion of a polymeric glycol selected from polyester glycols, polyether glycols and polythioether glycols, optionally from about 1 to 10 molar proportions of one or more low-molecular-weight aliphatic diols, and sufficient aromatic diisocyanate to react with essentially all of the hydroxyl groups of said polymeric glycol and said aliphatic diol, and (B) about 3–10 percent by weight of an ethylene/carboxylic acid copolymer prepared from ethylene and about 1.5 to about 30 weight percent of acrylic or methacrylic acid, the carboxyl groups of which are about 10% to 100% neutralized with an alkali metal, alkaline earth metal, or zinc ion.

2. A blend according to claim 1 wherein said polyurethane elastomer is prepared from a polythioether glycol.

3. A blend according to claim 1 wherein said polyurethane elastomer is prepared from a polyester glycol.

4. A blend according to claim 1 wherein said polyurethane elastomer is prepared from a polyether glycol.

5. A blend according to claim 1 wherein said aromatic diisocyanate is methylenebis(4-phenylisocyanate).

6. A blend according to claim 1 wherein said (B) comprises a copolymer of 85–95 percent ethylene and 5–15 percent of methacrylic or acrylic acid, the carboxyl groups of which are about 50%–100% neutralized with sodium or zinc ions.

7. A blend according to claim 6 wherein said polyurethane elastomer is prepared from a polythioether glycol.

8. A blend according to claim 6 wherein said polyurethane elastomer is prepared from a polyester glycol.

9. A blend according to claim 6 wherein said polyurethane elastomer is prepared from a polyether glycol.

* * * * *